United States Patent [19]

Matsutsuka

[11] 4,056,244
[45] Nov. 1, 1977

[54] TAPE CLAMPING DEVICE FOR TAPE-CONTAINING CASSETTES

[75] Inventor: Nobuaki Matsutsuka, Yokohama, Japan

[73] Assignee: Victor Company of Japan, Limited, Yokohama, Japan

[21] Appl. No.: 676,491

[22] Filed: Apr. 13, 1976

[30] Foreign Application Priority Data

Apr. 16, 1975 Japan .......................... 50-50533[U]

[51] Int. Cl.$^2$ .................... G03B 1/04; G11B 15/32; G11B 23/04; B65D 85/672
[52] U.S. Cl. .................................. 242/197; 206/387
[58] Field of Search .............. 242/197, 199, 55, 210; 206/387, 393, 53–55; 360/132

[56] References Cited

U.S. PATENT DOCUMENTS

| | | | |
|---|---|---|---|
| 3,604,556 | 9/1971 | Schwartz | 206/387 |
| 3,896,929 | 7/1975 | Mills | 206/387 |

Primary Examiner—Leonard D. Christian
Attorney, Agent, or Firm—Robert E. Burns; Emmanuel J. Lobato; Bruce L. Adams

[57] ABSTRACT

A device for clamping the tape of a cassette convoluted about the periphery of a hub rotatably mounted therein comprises a thin flat plate-like member having a pair of forked end portions engageable with an edge portion of a spindle-receiving opening of the cassette when fully inserted thereinto to permit the hub to rotate about its axis within a limited range.

8 Claims, 4 Drawing Figures

TAPE CLAMPING DEVICE FOR TAPE-CONTAINING CASSETTES

BACKGROUND OF THE INVENTION

The present invention relates to tape-containing cassettes, and particularly to a tape clamping device for use with tape-containing cassettes to prevent the tape from becoming loosened during shipment.

During shipment or transportation, tape-containing cassettes are each fitted with a tape-locking device or clamp to prevent the tape from becoming loosened due to the vibrations generated during the shipment. A prior art tape-locking device is snapped into position to firmly hold the tape-wound hubs in position with respect to the cassette housing. However, during shipment the outer convolutions of the tape will move in axial direction of the hub due to the inertial force acted thereupon by the vibrations or any mechanical shock. When the tape is played on a recording device, the outer convolutions of the tape will follow a path displaced from the desired path with respect to the transducer head.

SUMMARY OF THE INVENTION

The primary object of the present invention is therefore to provide an improved tape clamping device which is capable of avoiding the prior art inconvenience.

Another object of the invention is to provide an improved tape clamping device which is snapped in position into the opening of the cassette firmly against the opposite edge of the opening to prevent the rotational movement of the hubs, while permitting it to move axially in an opposite direction.

A further object of the invention is to provide an improved tape clamping device which comprises an elongated plate-like member of injection moulded plastic material having at each end a pair of bifurcated tongues extending at right angles to the web section of the member. Each of the tongues is provided with a lateral projection at the lower end thereof which, when the clamp is pushed in position into the opening, will engage the opposite edge of the opening, while the central portion of the tongues between the web and the projections extends between the adjacent ones of the teeth extending inwards from the hub.

BRIEF DESCRIPTION OF THE DRAWINGS

These and other objects, features and advantages of the invention will be understood from the following description taken in conjunction with the accompanying drawings, in which.

DESCRIPTION OF THE PREFERRED EMBODIMENTS

Figure 1:
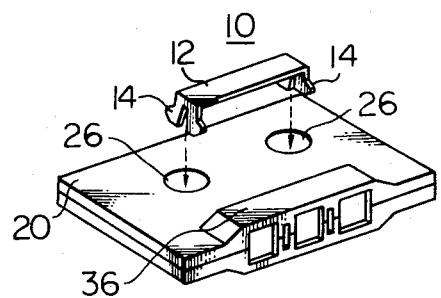
FIG. 1 is a pespective view illustrating a tape clamping device of the invention with respect to a tape-containing cassette.

FIG. 1 illustrates a cassette clamp 10 embodying the invention. The clamp 10 is injection moulded out of synthetic resin or like material, and comprises a thin flat plate-like member 12 having at each end an inverted U-shaped clip 14 integrally formed with the member 12. Each clip 14 comprises a pair of tongues 16 each having a triangular projection 18 having chamfered edges 18' and 18" projecting outwards from the lower end of the tongue. When the clip 14 is entirely unstressed the projections 18 extend outwards to their fullest extent as shown clearly in solid line in FIG. 2, but when the clip is being pushed into the hole of a cassette tongues 16 bend inwards into the position shown in chain dotted lines in the drawing.

Figure 3:
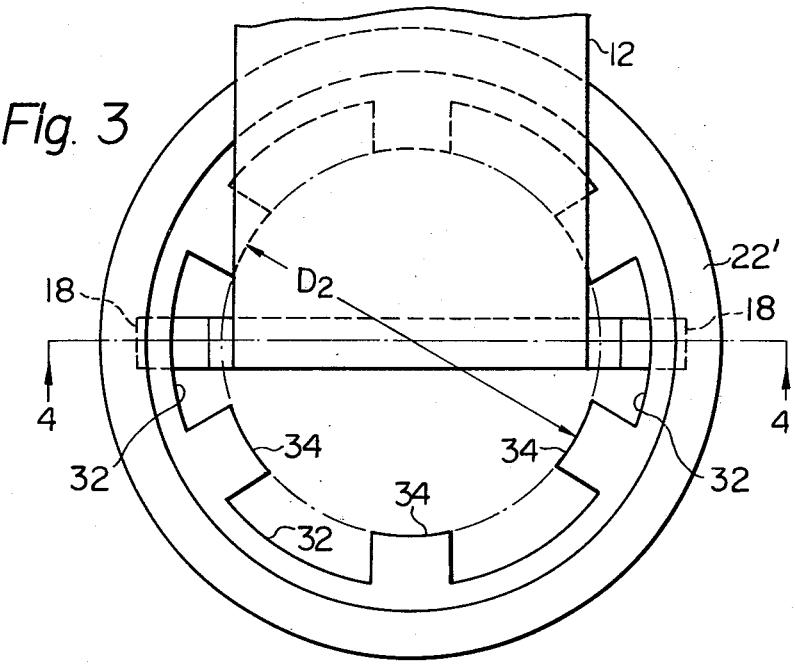
FIG. 3 is an enlarged top plan view of a portion of the tape clamping device shown fitted into an opening of the cassette.
Figure 4:
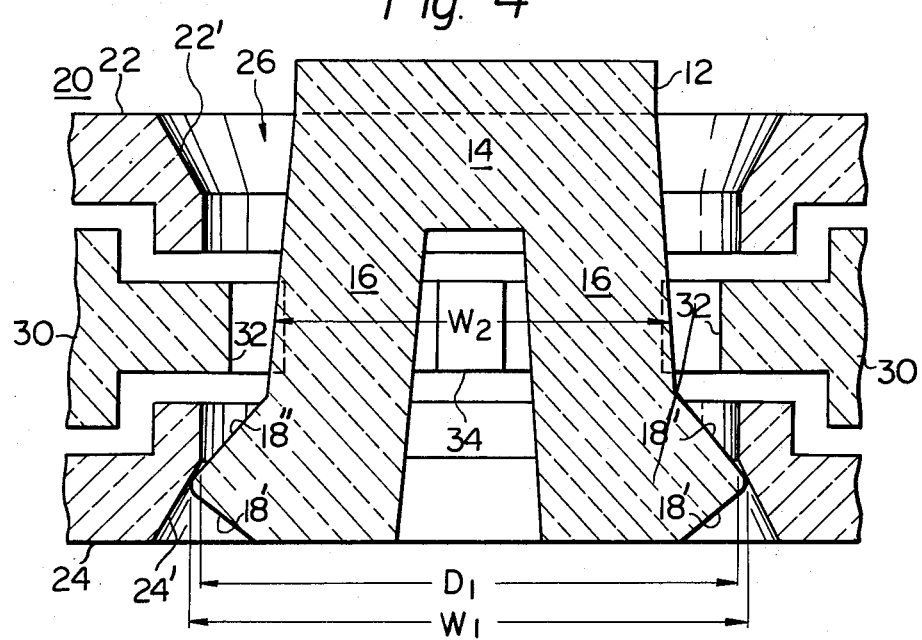
FIG. 4 is a cross-sectional view taken along the section line 4—4 of FIG. 3.

As clearly shown in FIG. 4, a tape-containing cassette 20 of the conventional design is constructed of a pair of identical housing members 22 and 24 having identical circular openings 26 coaxially aligned so that drive spindles of a tape recorder (not shown) extends therethrough. A pair of hubs 30 (only one is shown) is rotatably mounted within the cassette housing 20 and as in the usual manner, each provided with a circular aperture 32 and a plurality of teeth 34 extending inwards to the center of the aperture 32. The hubs 30 are so mounted about the opening 26 that its teeth 34 extend into the opening 26 for driving engagement with the tape drive spindle, as clearly shown in FIG. 3.

Figure 2:
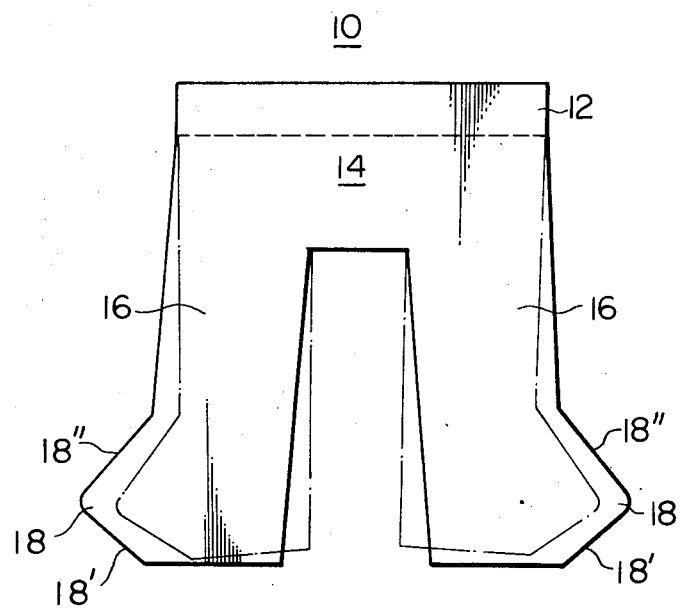
FIG. 2 is an end view of the tape clamping device of the invention.

To fix the clamp 10 in position on the tape cassette 20 shown in FIG. 4, the clamp 10 is pushed into position over the chamfered edge 22' with the clip 16 bent inwards as shown in chain dotted lines in FIG. 2 to enable the projection 18 to move over the inner wall of the opening 26 and the inner edge of the hub 30. The projections 18 then snap into position against the chamfered edge 24' of housing member 24.

It will be understood that to hold the clips in position, the ends of the projections 18 must be spaced a distance $W_1$, when the clips are entirely unstressed, which is larger than the diameter $D_1$ of opening 26 and that the axial dimension of the tongues 16 is the same as the distance between the opposite surfaces of the cassette housing 20 so that the tipped ends of the projections 18 engage the chamfered edge 24'.

With the clamp being held in position unstressed, the opposite sides of the tongues 16 at a point intermediate the member 12 and the lower end must be spaced a distance $W_2$ which is slightly larger than the inner diameter $D_2$ of hub 30 formed by the inner edge of teeth 34 by rotation of the hub as indicated by chain dotted lines in FIG. 3.

By this dimensioning of the clamp of the invention, the tongues 16 are engageable with the side faces of the teeth 34 and the rotation of hub 30 is limited to within a small angle determined by the space between adjacent ones of the teeth 34. The hub is thus permitted to move in opposite directions along its axis by an amount determined by the clearance provided between the inner walls of the housing members 22, 24 and the opposite faces of the hub 30, so that the tape rolled around the hub is caused to move together with the hub. Therefore, the outer convolution of the rolled tape will not tend to displace in axial directions due to the inertial force which would otherwise occur when the hub 30 is tightly locked in position as is the case in the prior art clamp.

To remove the clamp 10 from the cassette housing, the clamp is pulled off the housing with the clip 16 bent inwards again to enable the projections 18 to move over the inner wall of the opening 26 as well as the inner edge of the hub 30. It is appreciated that both chamfered edges 18' and 18" are at an angle to the axis of the opening 26 in opposite directions to permit easy insertion and removal of the clamp.

With the clamp 10 being fixed in position, the cassette 20 may be piled upon another when packaged within a case for shipment. Since the conventional cassette 20 has an enlarged portion 36 on each side of the housing along its front wall, the thickness of the member 12 of the clamp 10 is preferably equal to or smaller than the height of the enlarged portion so that cassettes are piled one upon another vertically straight or placed side by side at equal spacing.

What is claimed is:

1. A tape clamping device for a tape-containing cassette having a cassette housing with a pair of identical openings extending through the housing, a pair of reel hubs each having an aperture rotatably mounted within the housing coaxial with each of said openings and having a plurality of teeth extending inwardly from the inner wall of the aperture and adapted to mesh in use with a driving means provided in a tape recording and reproducing apparatus, the device comprising a plate-like member and a pair of laterally spaced limbs connected at one end to said plate-like member and extending substantially at right angles to the plane of said plate-like member and insertable through a space between adjacent ones of said teeth of one of said hubs and into one of said openings and removable therefrom, the longitudinal dimension of said limbs being substantially equal to the axial dimension of said one opening of the cassette housing, and the transverse dimensions of said limbs at the forward end thereof being slightly greater than the cross-sectional dimension of said one opening and at a portion intermediate their ends being slightly greater than a cross-sectional dimension defined by a locus of the inner end of said teeth by rotation of the hub and smaller than the cross-sectional dimension of said aperture of the hub, said limbs being capable of bending slightly toward each other upon insertion into said one opening and restoring to the original condition upon removal therefrom, whereby the intermediate portion of the limbs is disposed between adjacent ones of said teeth while the forward ends of the limbs engage the rear end portion of said one opening when the limbs are fully inserted thereinto.

2. A tape clamping device as claimed in claim 1, further comprising a second pair of limbs identical to the first pair of limbs and connected to said plate-like member axially spaced from the first-mentioned pair of limbs and extending substantially at right angles to the plane of said plate-like member and insertable through a space between adjacent ones of said teeth of another of said hubs into the other of said openings and removable therefrom.

3. A tape clamping device as claimed in claim 1, wherein the opening of said cassette housing has a pair of chamfered edges at the opposite ends thereof, and wherein each of said limbs is formed with a transversely outwardly projecting section engageable with said chamfered edge when the limbs are inserted into said opening to the fullest extent.

4. A tape clamping device as claimed in claim 1, wherein said transversely outwardly projection section has a triangular configuration.

5. A tape clamping device as claimed in claim 2, wherein said limbs are integrally formed with said strip member by injection moulded plastic material.

6. A tape clamping device as claimed in claim 1, wherein said limbs have a generally tapered configuration from narrow to wide in a direction away from said plate-like member.

7. A tape clamping device as claimed in claim 1, wherein said limbs are formed by a generally U-shaped planar member having a thickness smaller than the spacing between adjacent ones of said teeth.

8. A tape clamping device as claimed in claim 7, wherein said U-shaped configuration is tapered from narrow to wide in a direction away from said plate-like member.

* * * * *